United States Patent
Jarmay

(10) Patent No.: US 8,971,144 B2
(45) Date of Patent: Mar. 3, 2015

(54) HARDWARE WRITE-PROTECTION

(71) Applicant: Nicholas Charles Leopold Jarmay, Chislehurst (GB)

(72) Inventor: Nicholas Charles Leopold Jarmay, Chislehurst (GB)

(73) Assignee: Quixant PLC (GB)

(*) Notice: Subject to any disclaimer, the term of this patent is extended or adjusted under 35 U.S.C. 154(b) by 0 days.

(21) Appl. No.: 13/745,746

(22) Filed: Jan. 18, 2013

(65) Prior Publication Data

US 2013/0188437 A1    Jul. 25, 2013

Related U.S. Application Data

(60) Provisional application No. 61/588,633, filed on Jan. 19, 2012.

(51) Int. Cl.
| | | |
|---|---|---|
| *G11C 7/00* | (2006.01) | |
| *G11C 5/14* | (2006.01) | |
| *G06F 9/44* | (2006.01) | |
| *G06F 12/14* | (2006.01) | |

(52) U.S. Cl.
CPC ............... *G11C 5/14* (2013.01); *G06F 9/4401* (2013.01); *G06F 12/1433* (2013.01)
USPC ...... 365/228; 365/189.05; 711/163; 711/164; 711/152

(58) Field of Classification Search
USPC .............. 365/228, 189.05; 711/163, 164, 152
See application file for complete search history.

(56) References Cited

U.S. PATENT DOCUMENTS

| | | | |
|---|---|---|---|
| 5,592,609 A | 1/1997 | Suzuki et al. | |
| 5,599,231 A | 2/1997 | Hibino et al. | |
| 5,680,533 A | 10/1997 | Yamato et al. | |
| 5,680,534 A | 10/1997 | Yamato et al. | |
| 5,724,549 A | 3/1998 | Selgas et al. | |
| 5,802,583 A * | 9/1998 | Yeager et al. | 711/152 |
| 5,845,332 A | 12/1998 | Inoue et al. | |
| 5,881,002 A | 3/1999 | Hamakawa | |
| 5,991,194 A | 11/1999 | Jigour et al. | |
| 6,149,522 A | 11/2000 | Alcorn et al. | |
| 6,379,252 B2 | 4/2002 | Takata et al. | |
| 6,488,581 B1 | 12/2002 | Stockdale | |
| 6,643,751 B2 * | 11/2003 | Rosenquist et al. | 711/163 |
| 6,715,049 B1 | 3/2004 | Hayakashi | |
| 6,875,109 B2 | 4/2005 | Stockdale | |
| 6,963,501 B2 | 11/2005 | Shiga | |
| 6,996,721 B2 * | 2/2006 | Gentile | 713/190 |

(Continued)

FOREIGN PATENT DOCUMENTS

AU    WO2005026951 A1    3/2005

*Primary Examiner* — Connie Yoha
(74) *Attorney, Agent, or Firm* — Richards Patent Law P.C.

(57) ABSTRACT

A system for providing write-protection functionality to a memory device includes: a memory device including configurable registers controlling write and erase operations in the memory device; a system interface; a filter logic device in electrical communication with the memory device and further in communication with the system interface; and a power on reset circuit in communication with the system interface and the filter logic device, wherein the power on reset circuit asserts a reset signal to the system interface on startup of the system, further wherein, while the reset signal is asserted to the system interface, the filter logic device modifies the configurable registers to prevent all further write and erase operations to the memory device and then the power on reset circuit de-asserts the reset signal to the system interface enabling communication between the system interface and the memory device.

12 Claims, 3 Drawing Sheets

(56) References Cited

U.S. PATENT DOCUMENTS

| | | |
|---|---|---|
| 7,051,180 B2 | 5/2006 | Downer et al. |
| 7,093,091 B2 | 8/2006 | DeCaro |
| 7,108,605 B2 | 9/2006 | LeMay et al. |
| 7,137,893 B2 | 11/2006 | Canterbury |
| 7,210,012 B2 * | 4/2007 | Lee et al. ............ 711/163 |
| 7,275,128 B2 | 9/2007 | DeCaro |
| 7,325,114 B2 | 1/2008 | DeCaro |
| 7,379,341 B2 * | 5/2008 | Shen et al. ............ 365/185.21 |
| 7,398,348 B2 | 7/2008 | Moore et al. |
| 7,581,256 B2 | 8/2009 | Cockerille et al. |
| 7,689,805 B2 | 3/2010 | Moore et al. |
| 7,694,151 B1 | 4/2010 | Johnson et al. |
| 7,722,468 B2 | 5/2010 | Cockerille et al. |
| 7,736,234 B2 | 6/2010 | Cockerille et al. |
| 7,827,370 B2 | 11/2010 | Ahvenainen et al. |
| 7,861,058 B2 | 12/2010 | Moore et al. |
| 7,961,510 B2 | 6/2011 | Norman |
| 7,990,762 B2 | 8/2011 | Norman |
| 7,996,916 B2 | 8/2011 | Cockerille et al. |
| 2002/0004905 A1 | 1/2002 | Davis et al. |
| 2003/0203755 A1 | 10/2003 | Jackson |
| 2004/0049645 A1 | 3/2004 | Lee et al. |
| 2004/0259633 A1 | 12/2004 | Gentles et al. |
| 2004/0259640 A1 | 12/2004 | Gentles et al. |
| 2004/0266523 A1 | 12/2004 | Gentles et al. |
| 2004/0266533 A1 | 12/2004 | Gentles et al. |
| 2006/0053246 A1 | 3/2006 | Lee |
| 2006/0205513 A1 | 9/2006 | Breckner et al. |
| 2006/0248267 A1 | 11/2006 | Xie |
| 2007/0004501 A1 | 1/2007 | Brewer et al. |
| 2007/0021195 A1 | 1/2007 | Campbell et al. |
| 2007/0180269 A1 | 8/2007 | Irish et al. |
| 2007/0300207 A1 | 12/2007 | Booth et al. |
| 2008/0045342 A1 | 2/2008 | Crowder et al. |
| 2008/0064501 A1 | 3/2008 | Patel |
| 2008/0182659 A1 | 7/2008 | Sabella et al. |
| 2008/0254850 A1 | 10/2008 | Sylla |
| 2009/0124374 A1 | 5/2009 | Patel |
| 2009/0124375 A1 | 5/2009 | Patel |
| 2009/0203430 A1 | 8/2009 | Peek |
| 2009/0204777 A1 | 8/2009 | Norman |
| 2009/0280906 A1 | 11/2009 | Larsen et al. |
| 2009/0280907 A1 | 11/2009 | Larsen et al. |
| 2010/0041471 A1 | 2/2010 | Hamlin et al. |
| 2010/0048297 A1 | 2/2010 | Dasgupta |
| 2010/0062844 A1 | 3/2010 | Crowder et al. |
| 2010/0075760 A1 | 3/2010 | Shimabukuro et al. |
| 2010/0120529 A1 | 5/2010 | Shimabukuro et al. |
| 2010/0248816 A1 | 9/2010 | Liber et al. |
| 2011/0047416 A1 | 2/2011 | Moore et al. |
| 2011/0111865 A1 | 5/2011 | Cadima et al. |
| 2011/0115810 A1 | 5/2011 | Lawrence |
| 2011/0117994 A1 | 5/2011 | Harvey et al. |
| 2011/0118014 A1 | 5/2011 | Mitchell et al. |
| 2011/0118016 A1 | 5/2011 | Lawrence et al. |
| 2011/0131401 A1 | 6/2011 | Singh et al. |

* cited by examiner

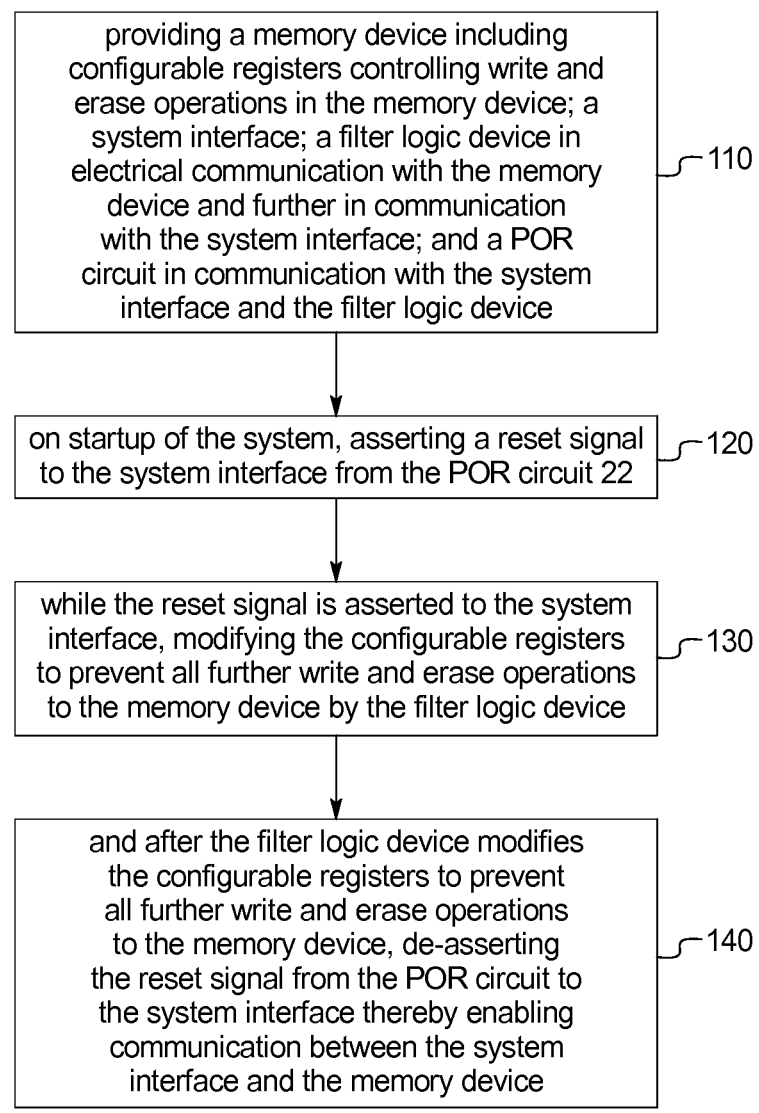

HARDWARE WRITE-PROTECTION

CROSS-REFERENCE TO RELATED APPLICATIONS

This application incorporates by reference and claims priority to U.S. Provisional Patent Application No. 61/588,633 filed Jan. 19, 2012.

BACKGROUND OF THE INVENTION

The present subject matter relates generally to systems and methods for securing write and erase operations in a memory device. More specifically, the present subject matter provides systems and methods in which a filter logic device is employed between a memory device and the system in which it is used to filter commands from the system to the memory device.

There are many computer systems in which one or more memory devices are used to store critical information within the computer system. While there are nearly limitless variations of such systems and environments in which they are used, the disclosure provided herein discussed the subject matter in the context of gambling machines. While described in the gambling machine context, it is understood that the teachings provided herein are applicable to any system in which one or more memory devices are used within the computer system.

Computer systems for use in gaming and gambling machines are often referred to as "slot machines." It is usually necessary for slot machines to comply with certain standards defined by government, state, or other regulatory bodies relating to the security of the slot machines, as they handle significant revenue streams. It is usual for there to be security requirements to ensure the machines are not tampered with, for example, to prevent manipulation of payouts to users or prevent tampering with the recording of transactions for the purpose of collecting government gaming taxes from machine operators. Of course, in other contexts, there may be additional or alternative regulatory security requirements.

Slot machine manufacturers also have a strong interest in security in order to protect their intellectual property and prevent cloning of their systems or designs and/or the use of legitimate machines outside of the agreed terms, for example installation of a newer game on a machine without payment. Again, in other contexts, there may be additional or alternative commercial security requirements.

As part of these security requirements (whether commercial or regulatory), it is usually necessary or valuable to be able to be able to protect certain memory devices from having their content modified (modified, overwritten, or erased) with a physical write-protection in order to prevent any attempt at tampering or unauthorized change. In slot machines, it is often a requirement that a physical jumper or switch is included should it be necessary to provide physical write-protection. The physical switch or jumper can be protected by a seal or other physical protection mechanisms that prevent unauthorized access and/or leave a telltale physical sign if someone has tampered with the physical write-protection.

While some memory devices include an electrical write-protect signal that, when asserted, prevents any write or erase of the memory device. However, many memory devices do not include intrinsic methods for electrical control over write or erase operations. These memory devices have been unusable when such security requirements exist. As a result, when there are security requirements, the choice of memory device is restricted by what is available in the market that works with the system. If a suitable device with intrinsic electrical write-protection is not available, there can be significant issues.

Accordingly, there is a need for systems and methods to provide electrical control of write and erase operations in memory devices that otherwise lack such security features.

BRIEF SUMMARY OF THE INVENTION

The present disclosure provides systems and methods to provide electrical control of write and erase operations in memory devices that otherwise lack such security features. Specifically, the present disclosure provides systems and methods in which a filter logic device is employed between a memory device and the system in which it is used to filter commands from the system to the memory device.

The subject matter provided herein addresses two main scenarios: (1) memory devices that include partial electrical write-protection (e.g., an electrical write-protect signal in addition to a configurable register settings that enable write/erase protection); and (2) memory devices that rely solely on configurable register settings for write-protection.

In the first case, there may be an electrical write-protect signal to the memory device, but certain register settings inside the memory device can be changed via software, which can alter the write-protection of the memory device. Such memory devices can be regarded as being partially hardware write-protected, but not fully secure in all circumstances. To enable such memory devices to be used in environments that require guaranteed write-protection requires additional logic, such as the solutions provided by this disclosure.

These devices typically include an electrical write-protect signal, but the write-protect function is further dependent on the programming of internal register bits, rendering the memory device not fully compliant to the requirement for absolute electrical control over the write/erase cycles. A typical memory device in this category may rely on a write-protect input signal to the memory device. However, the degree of write-protection provided when the input signal in its active state can be modified by certain settings held in configuration registers within the memory device. These register bits generally act to enable/disable write/erase protection of data storage areas (blocks) of the memory device. Write/erase operations are only prevented when these register bits are set in a particular way. The fact that software can modify settings that change the write-protection status of the memory data renders such memory devices unusable in certain secure applications.

To address these limitations, the present disclosure teaches adding a filter logic device between the memory device and the rest of the system to provide electrical write-protection to the memory device. The filter logic device absolutely controls the write-protection of the memory device, by both pre-configuring the configurable register settings into the appropriate state and by asserting or de-asserting an electrical write-protection signal to the memory device, as described further herein.

In operation, the filter logic device is in electrical communication with the memory device and also in communication with an electrical write-protect signal. The filter logic device is further located between the memory device and the system in which the memory device operates, such that the system can only access the memory device through the filter logic device. There are two scenarios: (1) when the electrical write-protect signal to the filter logic device is inactive; and (2) when the electrical write-protect signal to the filter logic device is active. In the first scenario, when the electrical write-protection signal into the filter logic device is inactive, the filter logic device de-asserts its electrical write-protection signal to the memory device. In other words, the filter logic device is transparent and does not modify the communication between the system and the memory device. In the second scenario, when the electrical write-protection signal into the filter logic device is active, the filter logic device configures the configurable register settings into the write-protect state and additionally asserts its electrical write-protection signal to the memory device. Accordingly, the filter logic device guarantees that no write/erase operations are allowed to take place in the memory device.

It is contemplated that there are various methods of accomplishing the electrical write-protection security applied to the memory device by the filter logic device. A preferred example is provided as follows.

When the computer system is initially powered up, a reset signal is applied to the filter logic device. As used herein, the reset signal (or reset condition) is any signal (or condition) that prevents the affected elements of the system from executing code or performing write and erase operations. In some cases, the reset signal may prevent the affected elements from powering up. In other cases, the reset signal may simply prevent the affected elements from executing code, even if they are powered up. The reset signal may be generated, for example, by a system POR (Power On Reset) circuit. When the reset signal to the filter logic device becomes inactive, the filter logic device asserts a reset signal to the elements of the computer system other than the memory device to hold the remainder of the system in a reset condition. The filter logic device then immediately performs a write operation to the configuration register(s) within the memory device to select the necessary configuration to prevent all further write operations to both the memory data area and also to prevent any subsequent modification of the configuration register settings that control the write-protection functions. To accomplish this, it may be necessary for the filter logic device to briefly de-assert the write-protect signal output from the filter logic device to the memory device. Once the re-configuration operation is completed, the write-protect signal from the filter logic device to the memory device is immediately re-asserted and held asserted for the entire time the system is switched on. Finally, the filter logic device enables the rest of the system to start by de-asserting the reset signal to the rest of the system.

It can be seen that because the filter logic device acts to set the necessary configuration register values to the "protect" state at the beginning of each power-up event, complete electrical write-protection of the memory device data is always guaranteed.

Turning now to the case in which the filter logic device is applied to memory devices that rely solely on configurable register settings for write-protection. Configuration register settings typically can be accessed and modified by software. Software mechanisms for write-protecting memory devices are often not accepted as adequate in environments where security protection is important. If the security protection is defeated via software means, there is no physical evidence that can be physically inspected to indicate that the memory device might have been modified. Hence, such devices are not normally usable in secure environments. These memory devices can also be protected by the solutions provided herein.

These memory devices rely solely on configurable register settings for write-protection and have no intrinsic method for providing an electrical signal to protect the device from write/erase operations. The filter logic device is provided between the memory device and the system similar to the embodiment described above. Upon system startup, while a reset signal is applied to the remainder of the system, the filter logic device configures the register settings to prevent any write/erase commands in the memory device. Then, once the register settings are configured for write-protection, the reset signal to the remainder of the system may be de-asserted.

In one example, a system for providing write-protection functionality to a memory device includes: a memory device including configurable registers controlling write and erase operations in the memory device; a system interface; a filter logic device in electrical communication with the memory device and further in communication with the system interface; and a power on reset circuit in communication with the system interface and the filter logic device, wherein the power on reset circuit asserts a reset signal to the system interface on startup of the system, further wherein, while the reset signal is asserted to the system interface, the filter logic device modifies the configurable registers to prevent all further write and erase operations to the memory device, further wherein, after the filter logic device modifies the configurable registers to prevent all further write and erase operations to the memory device, the power on reset circuit de-asserts the reset signal to the system interface enabling communication between the system interface and the memory device.

In some embodiments, the filter logic device further provides a write-protect signal to the memory device and the memory device prevents write and erase commands when the memory device receives the write-protect signal and the configurable registers are appropriately configured.

The reset signal may be any signal or condition that prevents the effected elements of the system from executing code or performing write and erase operations In one example, the power on reset circuit prevents the system interface from starting up when the reset signal is asserted. In another example, the power on reset circuit prevents the system interface from communicating with the memory device when the reset signal is asserted. In yet another example, the power on reset circuit prevents the system interface from executing any code when the reset signal is asserted.

An example of a method of providing write-protection functionality to a memory device includes the steps of: providing a memory device including configurable registers controlling write and erase operations in the memory device; a system interface; a filter logic device in electrical communication with the memory device and further in communication with the system interface; and a power on reset circuit in communication with the system interface and the filter logic device; on startup of the system, asserting a reset signal to the system interface from the power on reset circuit; while the reset signal is asserted to the system interface, modifying the configurable registers to prevent all further write and erase operations to the memory device by the filter logic device; and, after the filter logic device modifies the configurable registers to prevent all further write and erase operations to the memory device, de-asserting the reset signal from the power on reset circuit to the system interface thereby enabling communication between the system interface and the memory device.

The method may further include the step of providing a write-protect signal to the memory device from the filter logic device. Also, the power on reset circuit may perform any of numerous actions in connection with the reset signal, including: preventing the system interface from starting up when the reset signal is asserted; and/or preventing the system interface from executing any code when the reset signal is asserted.

It is contemplated that systems and methods provided herein may be applied such that certain areas of a memory device are covered by the write protection provided by the logic device and certain areas of the memory device are unprotected. Of course, in other embodiments, the entire memory device may be write protected by the logic device.

An advantage of the systems and methods provided herein is that they provide secure write-protection for memory devices that include partial electrical write-protection.

Another advantage of the systems and methods provided herein is that they provide secure write-protection for memory devices that rely solely on software controls for write-protection.

Another advantage of the systems and methods provided herein is that they may be used to enable otherwise unsecure memory devices to be used in computer systems in which secure write-protection methods are necessary.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3 is a flow chart depicting a method of providing write-protection functionality to a memory device.

DETAILED DESCRIPTION OF THE INVENTION

Figure 1:
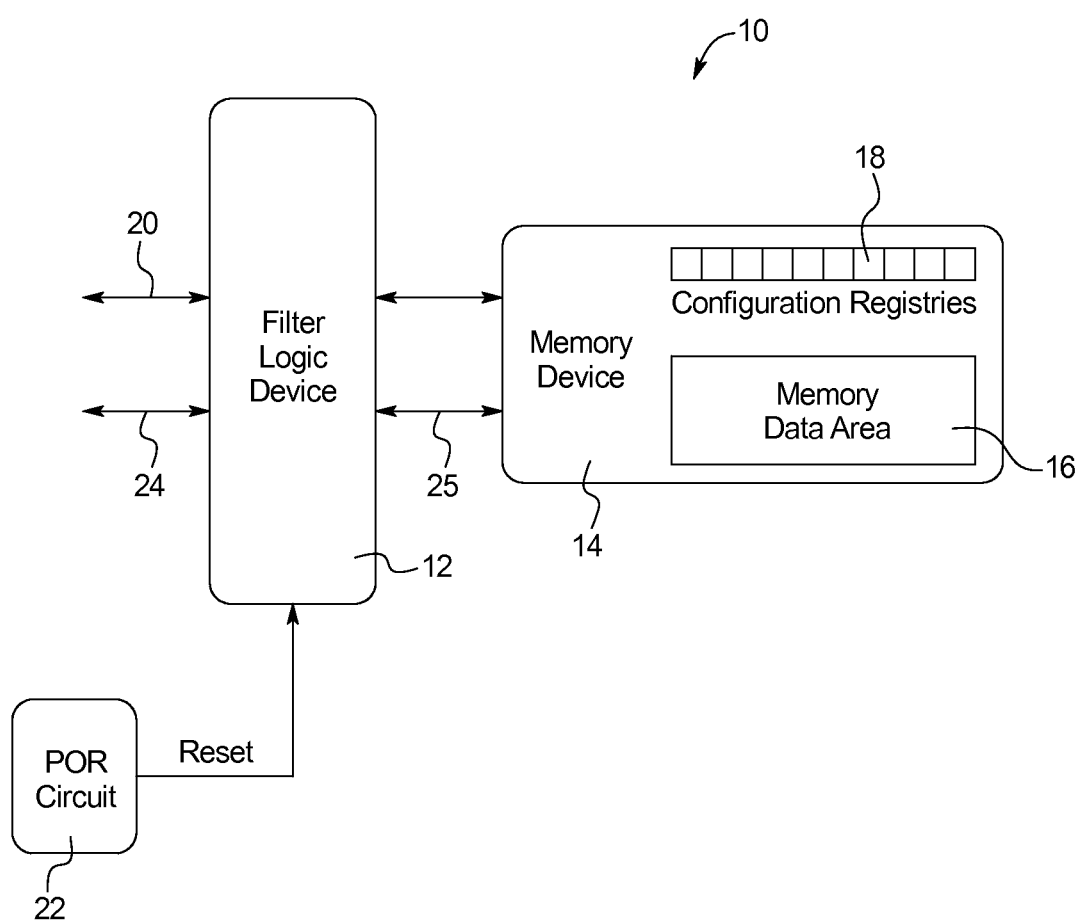
FIG. 1 is a schematic diagram of an embodiment of a system for providing electrical control of write and erase operations in memory devices.

FIG. 1 illustrates an example of an embodiment of a system for providing electrical control of write and erase operations in memory devices 10 (system 10). As shown in FIG. 1, the system 10 includes: a filter logic device 12; a memory device 14 including a memory data area 16 and one or more configurable registers 18; a system interface 20; and a power on reset (POR) circuit 22. As will be described in further detail, the filter logic device 12 is responsible for providing secured write-protection functionality to the memory device 14.

The system 10 shown in FIG. 1 is adapted for use in a slot machine operating using standard PC architecture. However, it is understood that the disclosures provided herein will enable those skilled in the art to implement the system 10 within various microprocessor controlled systems to provide write-protection functionality to memory devices 14. Accordingly, while the examples provided herein are provided in the context of use in a slot machine, the application of the system 10 is known to be much more broadly applicable.

In the example provided in FIG. 1, when the system 10 is initially powered up, POR circuit 22 applies a reset signal to the filter logic device 12. When the reset signal to the filter logic device 12 becomes inactive, typically after the system 10 reaches stable operating conditions after initial power up, the filter logic device 12 asserts a reset signal through the system interface 20 to the elements of the system 10 other than the memory device 14 (including the remaining elements of the system in which it is embodied, e.g., the slot machine operating using standard PC architecture) to hold the remainder of the system 10 in a reset condition. If the write-protect signal input 24 to the filter logic device 12 is asserted, the filter logic device 12 then immediately performs a write operation to the configuration registers 18 in the memory device 14 to select the necessary configuration to prevent all further write and/or erase operations to the memory data area 16 and also to prevent any subsequent modification of the configuration register 18. To accomplish this, it may be necessary for the filter logic device 12 to briefly de-assert a write-protect signal 25 output from the filter logic device 12 to the memory device 14. Once the re-configuration of the configuration registers 18 is completed, the filter logic device 12 asserts a write-protect signal 25 to the memory device 14, which is held asserted for the entire time the system 10 is active. Finally, the filter logic device 12 then enables the rest of the system 10 to start by de-asserting the reset signal applied through the system interface 20 to the rest of the system 10.

The example of the system 10 provided in FIG. 1 the filter logic device 12 acts to set the necessary configuration register values to the "protect" state at the beginning of each power-up event, as well as provide a write-protect signal 25 to the memory device 14 to provide complete electrical write-protection for the memory device 14.

Figure 2:
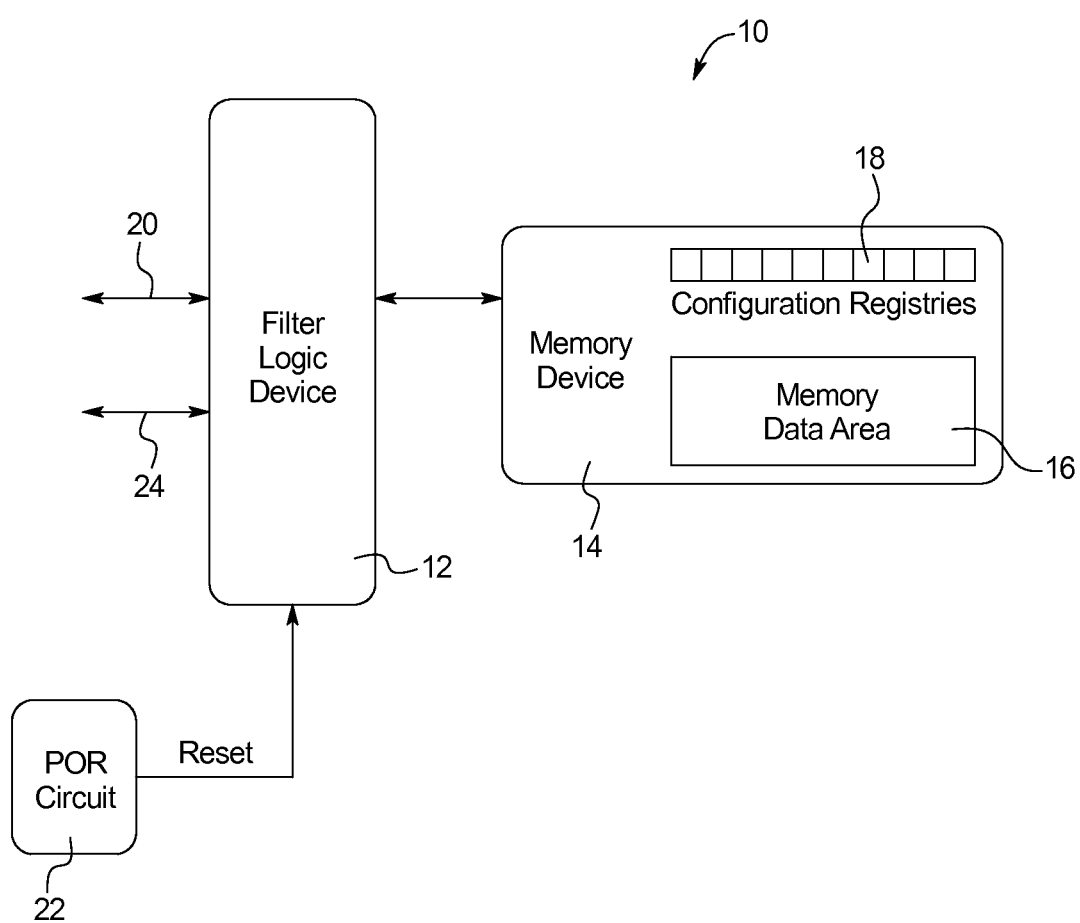
FIG. 2 is a schematic diagram of another embodiment of a system for providing electrical control of write and erase operations in memory devices.

Turning now to FIG. 2, the example of the system 10 shown is one in which the filter logic device 12 is applied to a memory device 14 that relies solely on configuration registers 18 for write-protection. Because the memory device 14 shown in FIG. 2 does not include an electrical write-protect signal, the configuration registers 18 provide the only write/erase protection. As shown, the filter logic device 12 is provided between the memory device 14 and the system interface 20 to monitor and control any communication from elements of the system 10 to the memory device 14.

In the embodiment shown in FIG. 2, the POR circuit 22 asserts a reset signal to the system interface 20 on startup of the system 10. Then, if the write-protect signal input 24 to the filter logic device 12 is asserted, while the reset signal is asserted to the system interface 20, the filter logic device 12 modifies the configurable registers 18 to prevent all further write and erase operations to the memory device 14. After the filter logic device 12 modifies the configurable registers 18 to prevent all further write and erase operations to the memory device 14, the POR circuit 22 de-asserts the reset signal to the system interface 20 enabling communication between the system interface 20 and the memory device 14.

Turning now to FIG. 3, a method of providing write-protection functionality to a memory device 100 is illustrated. As shown, the method 100 includes the steps of: providing a memory device 14 including configurable registers 18 controlling write and erase operations in the memory device 14; a system interface 20; a filter logic device 12 in electrical communication with the memory device 14 and further in communication with the system interface 20; and a POR circuit 22 in communication with the system interface 20 and the filter logic device 12 (step 110); on startup of the system 10, asserting a reset signal to the system interface 20 from the POR circuit 22 (step 120); while the reset signal is asserted to the system interface 20, modifying the configurable registers 18 to prevent all further write and erase operations to the memory device 14 by the filter logic device 12 (step 130); and after the filter logic device 12 modifies the configurable registers 18 to prevent all further write and erase operations to the memory device 14, de-asserting the reset signal from the POR circuit 22 to the system interface 20 thereby enabling communication between the system interface 20 and the memory device 14 (step 140).

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A system for providing write-protection functionality to a memory device comprising:
   a memory device including configurable registers controlling write and erase operations in the memory device;
   a system interface;
   a filter logic device in electrical communication with the memory device and further in communication with the system interface; and
   a power on reset circuit in communication with the system interface and the filter logic device, wherein the power on reset circuit asserts a reset signal to the system interface on startup of the system, further wherein, while the reset signal is asserted to the system interface, the filter logic device modifies the configurable registers to prevent all further write and erase operations to the memory device, further wherein, after the filter logic device modifies the configurable registers to prevent all further write and erase operations to the memory device, the power on reset circuit de-asserts the reset signal to the system interface enabling communication between the system interface and the memory device.

2. The system of claim 1 wherein the filter logic device further provides a write-protect signal to the memory device.

3. The system of claim 2 wherein the memory device prevents write and erase commands when the memory device receives the write-protect signal and the configurable registers are appropriately configured.

4. The system of claim 1 wherein the power on reset circuit prevents the system interface from powering up when the reset signal is asserted.

5. The system of claim 1 wherein the power on reset circuit prevents the system interface from communicating with the memory device when the reset signal is asserted.

6. The system of claim 1 wherein the power on reset circuit prevents the system interface from executing any code when the reset signal is asserted.

7. A method of providing write-protection functionality to a memory device comprising the steps of:
   providing a memory device including configurable registers controlling write and erase operations in the memory device; a system interface; a filter logic device in electrical communication with the memory device and further in communication with the system interface; and a power on reset circuit in communication with the system interface and the filter logic device;
   on startup of the system, asserting a reset signal to the system interface from the power on reset circuit;
   while the reset signal is asserted to the system interface, modifying the configurable registers to prevent all further write and erase operations to the memory device by the filter logic device; and
   after the filter logic device modifies the configurable registers to prevent all further write and erase operations to the memory device, de-asserting the reset signal from the power on reset circuit to the system interface thereby enabling communication between the system interface and the memory device.

8. The method of claim 7 further including the step of receiving, in the filter logic device, any communications from the system interface directed to the memory device.

9. The method of claim 7 further including the step of providing a write-protect signal to the memory device from the filter logic device.

10. The method of claim 7 wherein the power on reset circuit prevents the system interface from powering up when the reset signal is asserted.

11. The method of claim 7 wherein the power on reset circuit prevents the system interface from powering up when the reset signal is asserted.

12. The method of claim 7 wherein the power on reset circuit prevents the system interface from executing any code when the reset signal is asserted.

* * * * *

UNITED STATES PATENT AND TRADEMARK OFFICE
CERTIFICATE OF CORRECTION

PATENT NO.       : 8,971,144 B2
APPLICATION NO.  : 13/745746
DATED            : March 3, 2015
INVENTOR(S)      : Nicholas Charles Leopold Jarmany It is certified that error appears in the above-identified patent and that said Letters Patent is hereby corrected as shown below:

Title page, Items [12], [71] and [72] the surname of the inventor and applicant appearing on the first page of the patent should be Jarmany rather than Jarmay.

Signed and Sealed this
Twenty-fifth Day of August, 2015

Michelle K. Lee
*Director of the United States Patent and Trademark Office*